Jan. 31, 1956  W. PECHY  2,732,925
ARTICLE FEEDING AND TURNING MECHANISM
Filed Oct. 19, 1951  4 Sheets-Sheet 1

INVENTOR.
WILLIAM PECHY
BY Charles H. Erne
Leland R. McCann
George W. Reiber
ATTORNEYS

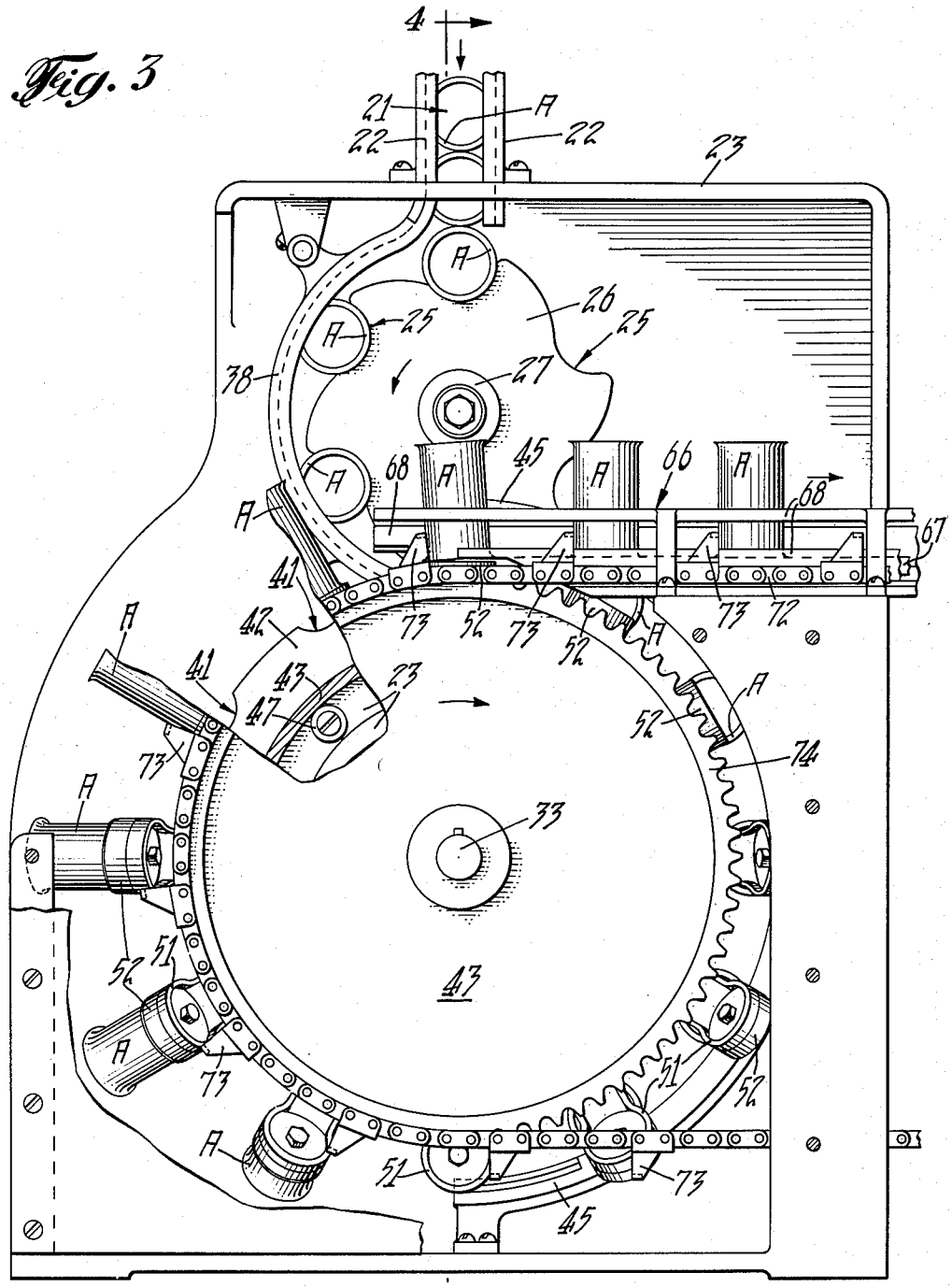

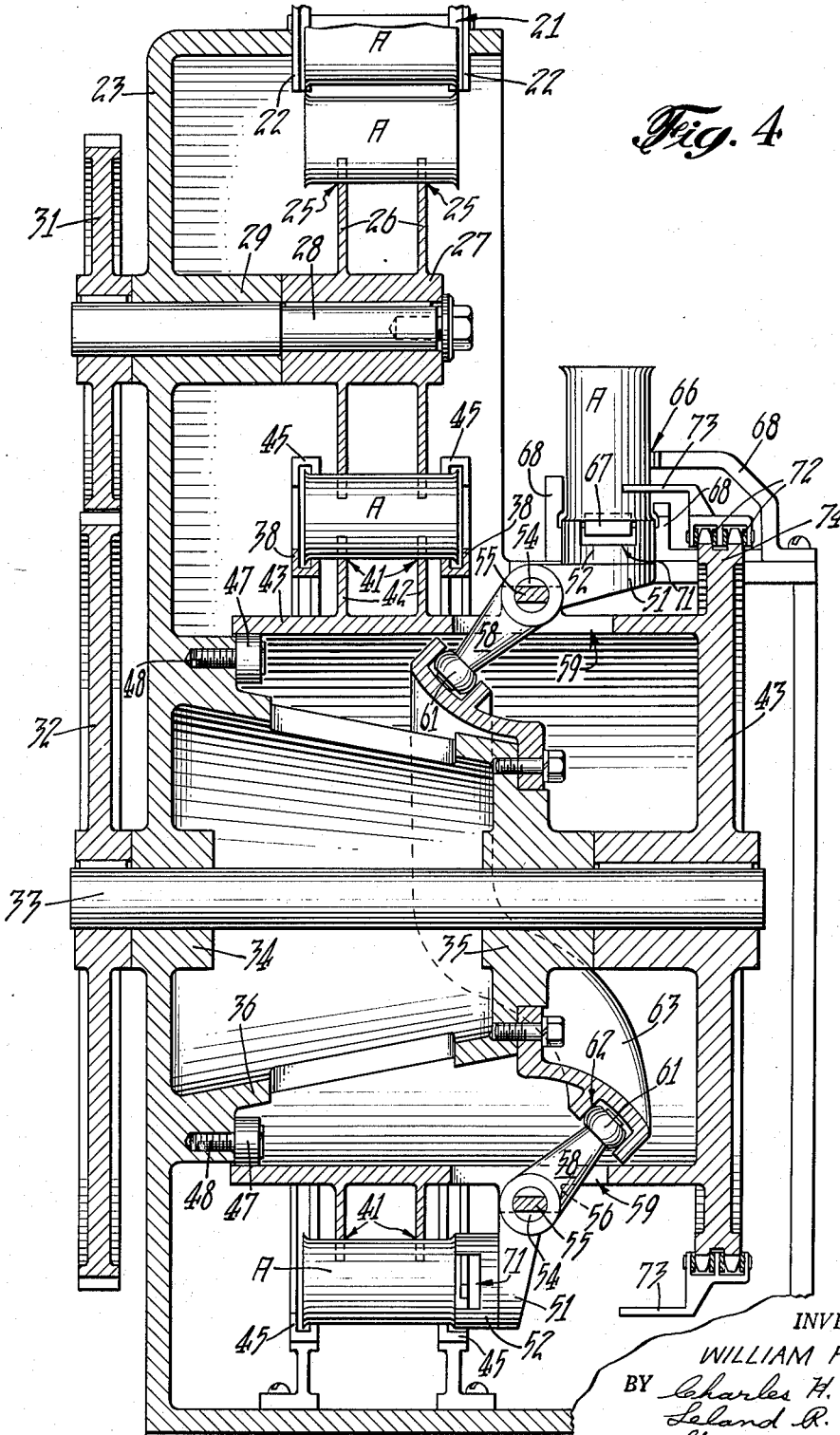

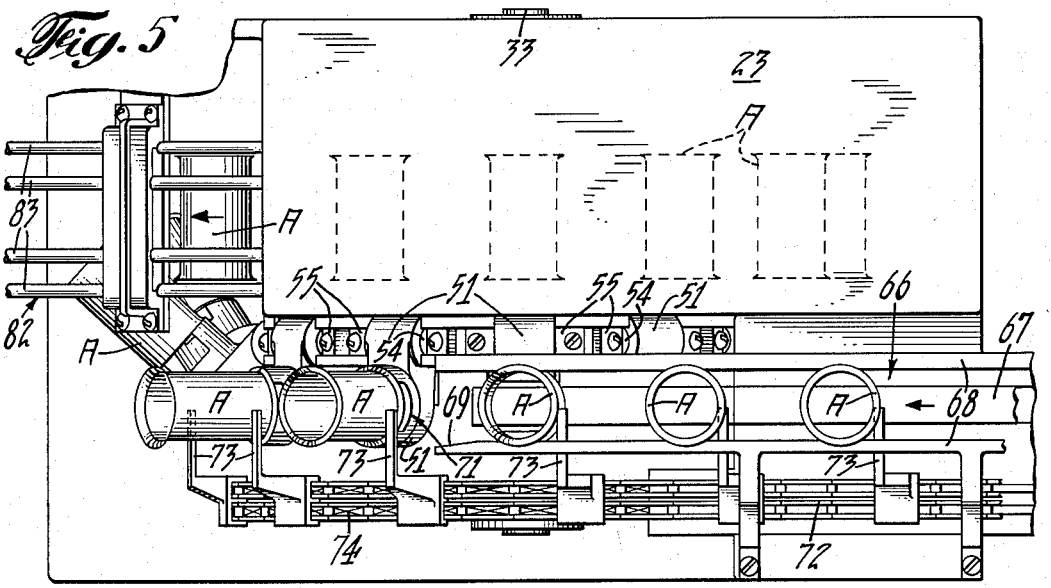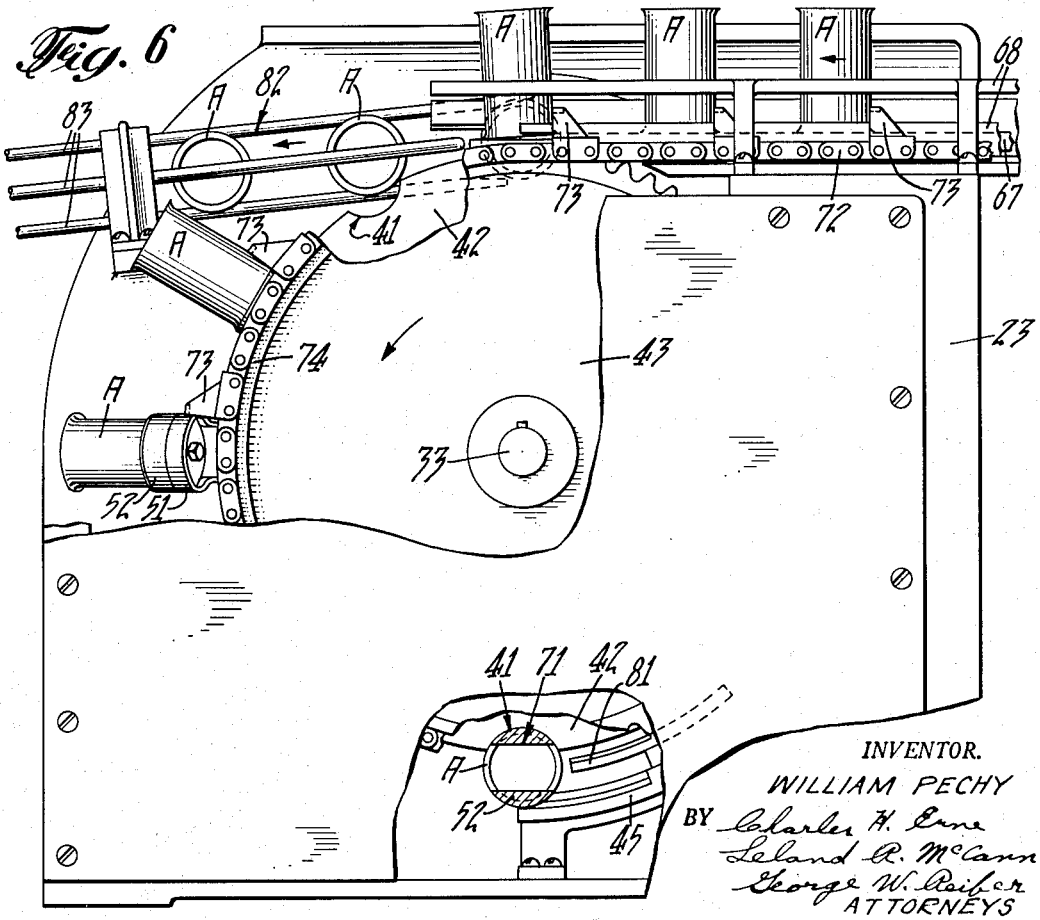

United States Patent Office 2,732,925
Patented Jan. 31, 1956

2,732,925

ARTICLE FEEDING AND TURNING MECHANISM

William Pechy, Belmar, N. J., assignor to American Can Company, New York, N. Y., a corporation of New Jersey Application October 19, 1951, Serial No. 252,058

11 Claims. (Cl. 198—33)

The present invention relates to a feeding mechanism for articles to be treated such as containers or cans or can bodies and has particular reference to devices for turning such an article from one position into another while the article is advanced along a predetermined path of travel.

An object of the invention is the provision of an article feeding and turning mechanism having simple rotary movements and of compact formation so that it can be readily interposed between two machines for performing operations upon the articles.

Another object is the provision of such a mechanism wherein articles such as cans or can bodies may be readily turned from one position into another, for example from a horizontal position into a vertical position, while traveling along a predetermined path of travel and with slight modifications of the inlet and outlet devices may be used in reverse order to turn the articles from a vertical into a horizontal or other different position.

Numerous other objects and advantages of the invention will be apparent as it is better understood from the following description, which, taken in connection with the accompanying drawings, discloses a preferred embodiment thereof.

Referring to the drawings:

Fig. 3 is a side elevation of the mechanism shown in Fig. 1, with parts broken away;

Fig. 4 is an enlarged sectional view taken substantially along the line 4—4 in Fig. 3, with parts broken away;

Fig. 5 is a top plan view of a modified form of the mechanism shown in Fig. 1, with parts broken away; and Fig. 6 is a side elevation of the form of mechanism shown in Fig. 5, with parts broken away.

Figure 1:
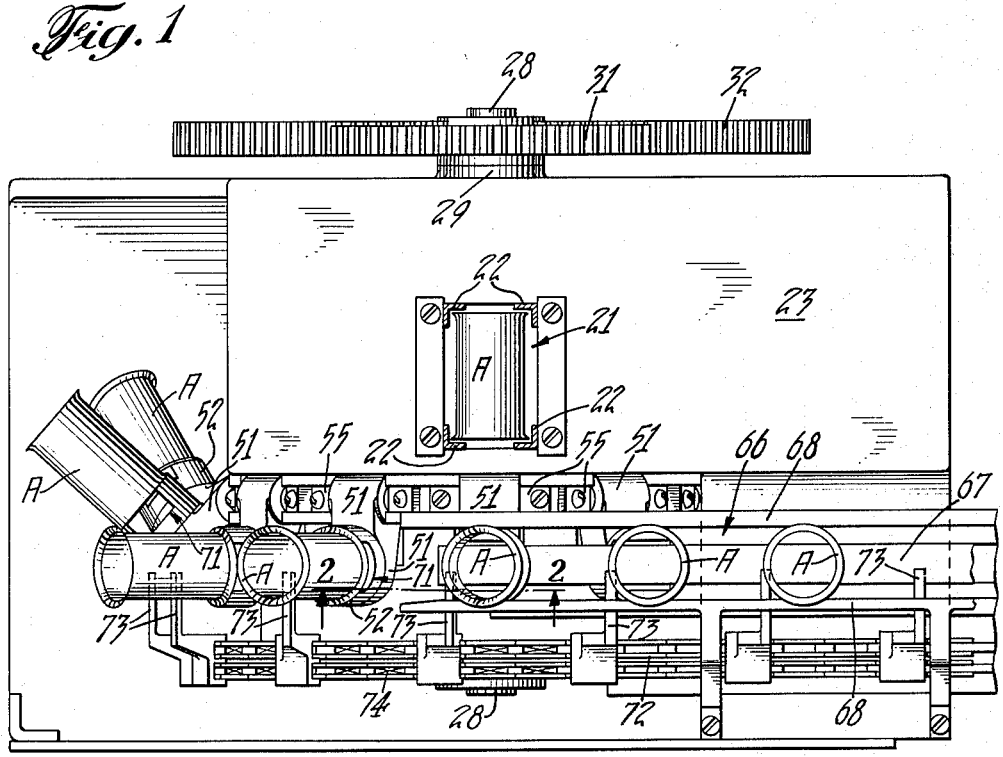
Figure 1 is a top plan view of an article feeding and turning mechanism embodying the instant invention, with parts broken away.
Figure 2:
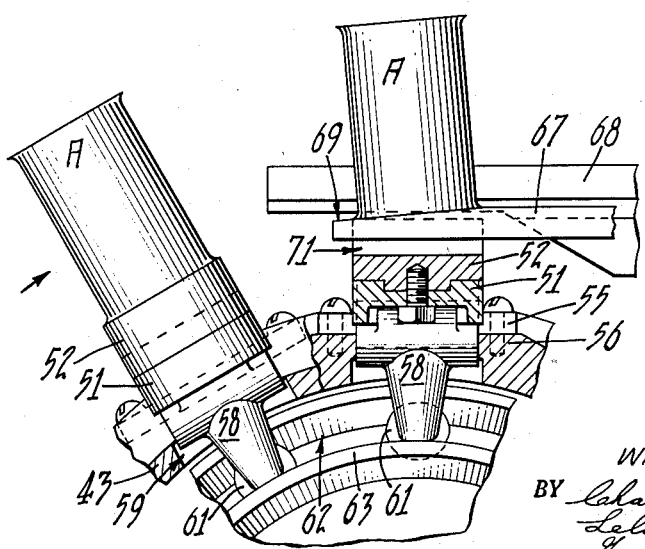
Fig. 2 is an enlarged sectional detail taken substantially along the line 2—2 in Fig. 1.

As a preferred or exemplary embodiment of the instant invention Figs. 1 to 4 inclusive of the drawings disclose a mechanism for turning sheet metal can bodies A from one position into a different position as they advance along a predetermined path of travel. The mechanism, when used for can bodies, may be interposed between a can body flanging machine and a closing machine which attaches the bottoms to the flanged bodies. The can bodies are discharged from the flanging machine in a horizontal position, i. e., on their sides so that they can readily roll out of the machine by way of a chute or runway. However, the closing operation preferably is effected while the can bodies are in a vertical or on-end position. Hence the bodies must be turned from the horizontal to the vertical position. It is this turning operation that is effected by the mechanism of the instant invention while the can bodies advance from the flanging machine to the closing machine.

The horizontally disposed can bodies A enter the mechanism preferably by way of a vertical runway 21 (Figs. 1, 3 and 4) defined by oppositely disposed pairs of angleiron guide rails 22 secured to the top of a frame 23 which constitutes the main frame of the mechanism. The can bodies A individually fall by gravity into spaced pockets 25 of a pair of continuously rotating timing wheels 26 formed on a hub 27 mounted on a horizontally disposed driven shaft 28. The timing wheels 26 are located directly beneath the terminal end of the runway 21. The driven shaft 28 is journaled in a bearing 29 formed on the frame 23. The outer end of the shaft projects beyond the bearing 29 and carries a gear 31, which meshes with and is rotated by a driving gear 32 mounted on the outer end of a driving shaft 33. The driving shaft is journaled in a bearing 34 formed in the frame 23 and in a co-operating spaced bearing 35 formed in a large hollow frusto-conical projection or housing 36 which extends inwardly from the frame 23. The driving shaft 33 may be driven in any suitable manner in the direction shown by the arrow in Fig. 3 through the year 32 or by direct connection with the shaft.

Hence as the timing wheels 26 rotate in the direction shown by the arrow in Fig. 3, beneath the terminal end of the runway 21, the can bodies A fall into the spaced pockets 25 of the timing wheels and are carried downwardly in a horizontal position in spaced and timed order along a curved path of travel. A pair of curved spaced and parallel guide rails 38 (Fig. 3) forming continuations of two of the runway guide rails 22 are disposed adjacent the outer peripheries of the timing wheels to retain the can bodies A in the wheel pockets 25 during their travel with the wheels. These guide rails 38 extend substantialy halfway around the timing wheels and terminate under or below the wheels.

The timing wheels 26 deliver the horizontally disposed can bodies A into spaced peripheral container receiving and advancing pockets 41 of a can body feeding turret preferably comprising a pair of spaced and parallel webs 42 (Figs. 3 and 4) which are disposed below and align vertically with the timing wheels 26. The turret webs 42 preferably are formed on the outer peripheral surface of a rotatable drum or carrier member 43. This drum 43 surrounds the frusto-conical housing 36 and is mounted on and keyed to the driving shaft 33 so that the drum rotates with the shaft in the direction of the arrow shown in Fig. 3. In this manner through the meshing gears 31, 32, the drum is rotated in time with the timing wheels 26 to effect proper register of the pockets 41 of the turret webs 42 with the pockets 25 of the timing wheels 26.

Curved spaced and parallel guide rails 45 disposed adjacent the outer periphery of the turret webs 42 overlap the terminal ends of the timing wheel guide rails 38 and thus transfer the horizontally disposed can bodies A from the timing wheel pockets 25 to the turret pockets 41 as these pockets register. The guide rails 45 extend substantially halfway around the turret webs 42 and terminate at the bottom of the drum to retain the can bodies in the turret pockets 41. Antifriction support rollers 47 (Fig. 4) mounted on studs 48 secured in the base portion of the frusto-conical housing 36 engage against the inner face of the drum 43 adjacent the edge most remote from the hub of the drum and thus firmly support this end of the drum.

Adjacent the body feeding turret webs 42 the drum 43 carries a plurality of gripper heads 51 which carry gripper devices, preferably permanent magnets 52. There is one gripper head 51 for each feeding turret pocket 41 and each head is located adjacent its pocket. These heads are disposed adjacent the outer periphery of the drum 43 and are mounted for hinging or swinging action toward and away from one end of the turret pockets. The heads hinge on pivot pins 54 having flat ends 55 which extend beyond the heads on both sides thereof (see Fig. 2) and which are secured to bosses 56 formed on the outer periphery of the drum. Beyond the pivot pins 54, the heads 51 are formed with actuating arms 58 which extend through clearance slots 59 formed in the drum 43. Within the drum, the ends of the arms 58 carry cam rollers 61 which operate in a cam groove 62 of a stationary barrel cam 63 secured to the inner end of the frusto-conical housing 36.

Thus as the drum 43 rotates, it carries the head actuating arms 58 around the cam 63 and causes the cam rollers 61 to traverse the cam groove 62. The cam groove 62 is shaped to swing the gripper heads 51 toward the adjacent end of turret pockets 41 as the rotating drum 43 carries a head adjacent the lower terminal ends of the feeding turret guide rails 45 as best shown in Figs. 3 and 4. In this position of a head 51, its gripper magnet 52 aligns with and engages the flanged end of the horizontally disposed can body A in its feeding turret pocket 41 as shown at the bottom of Fig. 4. In this position of the head the magnet grips and holds the can body; the turret pocket, the can body, and the magnet advancing in unison and temporarily being in axial alignment.

As the gripped horizontally disposed can body A advances beyond the guide rails 45, the magnet retains the body temporarily in its turret pocket. At this point in the travel of the can body the shape of the cam groove 62 changes to gradually swing the head 51 and its horizontally disposed gripped can body outwardly until the can body is shifted into a vertical position, the axis of the body in this position being radial in respect to the drum 43 as best shown in the upper portions of Figs. 3 and 4. This swinging of the can body A into vertical position takes place as the head 51 travels upwardly from the bottom of the drum 43 to its top position. When the head reaches the top of the drum, the axis of the can body is vertical and the can is resting on one end.

With the can body A in its vertical position at the top of the drum, it aligns with and is advanced into an auxiliary feeding device which preferably comprises a horizontal runway 66 (Figs. 1 and 3) defined by a bottom support bar 67 and a pair of spaced and parallel side guides 68. The entrance end of the bottom support bar 67 is disposed adjacent the drum 43 and is formed with a tapered top face 69 (see Fig. 2) which is substantially tangent with the circular path of travel of the bottom end of the can body A as it reaches the top of the drum. Clearance slots 71 are formed in the magnets 52 to permit the magnets to by-pass this support bar.

Hence when a can body reaches the top of the drum 43, it rides up on the tapered face 69 of the runway support bar 67 and is thus stripped from its gripping magnet. Simultaneously with the stripping action, the freed vertically disposed can body A is pushed into the runway 66. This is effected preferably by an endless chain auxiliary feed conveyor 72 having spaced can body propelling fingers 73 disposed adjacent and behind the gripper heads 51. This conveyor operates over an actuating sprocket 74 which is integral with the drum 43 and therefore rotates with the drum thus driving the conveyor 72 and its fingers 73 in time with the advancement of the can bodies A. The upper run of the conveyor 72 extends alongside of the auxiliary feed runway 66 with the fingers 73 projecting laterally into the runway.

Thus as a can body A is stripped from its magnet 52, the adjacent finger 73 on the conveyor 72 immediately engages behind the released can body and advances it along the runway 66 to any suitable place of deposit, which in the instant case is a closing machine for receiving the body and attaching a bottom thereto. After removal of the can body A from the head 51, the head passes under the runway 66 and continues its rotation with the drum 43 toward the bottom thereof to complete its cycle of operation. As the head approaches the bottom of the drum, adjacent the terminal end of the feed guide rails 45, the stationary cam groove 62 again swings the head toward the adjacent turret pocket 41 to grip another can body A for a repeat operation. This completes the cycle of operation of the mechanism.

With slight modifications such as a change in direction of the rotation of the drum 43 and the provision of a stripper rail 81 (Fig. 6) adjacent the path of travel of the turret pockets 41, the above feeding and turning mechanism can be readily operated to receive the can bodies A in a vertical position and turn them into a horizontal position for further advancement. Such a modified form of the mechanism is disclosed in Figs. 5 and 6 of the drawings.

In this modified form of the apparatus the runway 66 and the conveyor 72 with its fingers 73 constitute the feeding devices and operate to advance the can bodies A in spaced and timed order toward the drum 43. The drum 43 is rotated in a counterclockwise direction as viewed in Fig. 6 and indicated by the arrow. As the gripper heads 51 rotating with the drum, move up under the runway 66 in time with the advancement of the can bodies therealong, the magnets 52 on the heads align with and grip the lower ends of the bodies and thus remove them from the runway and carry them forward with the drum (toward the left in Figs. 5 and 6). The drum carries the gripped bodies downwardly through a curved path of travel toward the terminal ends of the curved guide rails 45. During this travel of the bodies the stationary cam groove 62 hinges the gripper heads 51 to swing the bodies into a horizontal position and simultaneously deposit them into the adjacent turret pockets 41 of the turret webs 42 which now constitute the auxiliary feeding device. A can body is fully within its pocket and retained there by its gripper head 51 when the body and head reach the terminal end of the curved guide rails 45 (as best shown in Fig. 6).

As soon as a pocketed can body A passes the terminal end of the curved guide rails 45 and is well over the rails so that it can be supported by them, the gripped end of the body advances toward the stripper rail 81 and causes the rail to be inserted between the end of the body and the gripper magnet 52 on the head 51, the rail extending into the clearance slot 71 in the magnet. Thereafter, as the drum 43 continues its rotation, the head 51 is rocked by the cam groove 62, back into its original position for the reception of a subsequent body and a repeat turning operation. This return rocking of the head removes it from the horizontally disposed body as the body is held in its pocket 41 by the stripper rail 81 and the curved guide rails 45. The freed horizontally disposed can body A is thus retained in its turret pocket 41 until it reaches the top of the drum. At this point in the travel of the can body it may be further advanced by the timing wheels 26 to any suitable place of deposit or may be discharged in any other suitable manner. Preferably the turned can bodies are discharged by gravity and rolling action from the pockets 41 into an inclined chute 82 (Figs. 5 and 6) defined by spaced and parallel guide bars 83 which permit the horizontally disposed can bodies to roll and to be guided to any suitable place of deposit. This completes the travel of a can body in this modified form of the mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container feeding mechanism, comprising in combination a carrier member rotatable on an axis, a feeding conveyor disposed adjacent and in axial alignment with said carrier member for feeding containers in a horizontal position, an auxiliary feeding conveyor disposed adjacent and in axial alignment with said carrier member for feeding containers in a vertical position, means for rotating said carrier member and said conveyors on said axis in unison, a tiltable head carried on and moving with said carrier member, gripper means on said head for gripping an end of a container, and means for tilting said head into position adjacent an end of a container on one of said conveyors to remove the container therefrom and for tilting said head and the gripped container into alignment with the other of said conveyors for the reception of the container by said other conveyor.

2. A container feeding mechanism, comprising in combination a rotatable carrier member, a feeding turret disposed adjacent and in axial alignment with said carrier member, said turret having spaced peripheral pockets for receiving containers in a horizontal position, means adjacent said pockets for retaining said containers in place, actuating means for rotating said carrier member and said feeding turret in unison, auxiliary feeding means disposed adjacent said carrier member for receiving containers in a vertical position, a plurality of gripper heads mounted on said carrier member in movable relation thereto, said heads being singly located adjacent said turret pockets, gripper means on each of said heads for gripping a container, and means for shifting said heads into engagement with the horizontally disposed containers in said turret pockets for removing the containers therefrom and for further shifting said heads to turn said containers into a vertical relation in alignment with said auxiliary feeding means for reception of the containers thereby.

3. A container feeding mechanism, comprising in combination a rotatable drum carrier member, a feeding turret mounted on said drum carrier member and rotatable therewith, said turret having spaced peripheral pockets for receiving containers in a horizontal position, means adjacent said pockets for retaining said containers in place, actuating means for rotating said drum carrier member, auxiliary feeding means disposed adjacent said carrier member and spaced from said turret axially relative to said carrier member for receiving containers in a vertical position, a plurality of magnetic gripper heads mounted on said carrier member and located one adjacent each of said turret pockets, pivotal mountings on said carrier member for said gripper heads, and stationary cam means disposed adjacent said drum carrier member for pivoting said heads into engagement with the ends of said horizontally disposed containers in said turret pockets for removing the containers therefrom and for further pivoting said heads to tilt said containers into a vertical position in alignment with said auxiliary feeding means for reception of the containers thereby.

4. A container feeding mechanism, comprising in combination a rotatable carrier member, a feeding turret disposed adjacent and in axial alignment wth said carrier member, said turret having spaced peripheral pockets for receiving containers in a horizontal position, means adjacent said pockets for retaining said containers in place, actuating means for rotating said carrier member and said feeding turret in unison, a runway leading from said carrier member for receiving containers in a vertical position, conveyor means adjacent said runway for advancing vertically disposed containers therealong, means for actuating said conveyor in unison with said carrier member, a plurality of gripper heads mounted on said carrier member in movable relation thereto, said heads being singly located adjacent said turret pockets, gripper means on each of said heads for gripping a container, and means for shifting said heads into engagement with the horizontally disposed containers in said turret pockets for removing the containers therefrom and for further shifting said heads to turn said containers into a vertical relation in alignment with said runway and in time with said conveyor for advancement along said runway by said conveyor.

5. A container feeding mechanism, comprising in combination a rotatable carrier member, feeding means disposed adjacent the outer periphery of said carrier member for advancing toward said member containers arranged in upright and processional order, an auxiliary feeding turret disposed adjacent and in axial alignment with said carrier member, said turret having spaced peripheral pockets for receiving containers in a horizontal position, means adjacent said pockets for retaining said containers in place, actuating means for rotating said carrier member and said feeding turret in unison, a plurality of gripper heads mounted on said carrier member in movable relation thereto, said heads being singly located adjacent said turret pockets, gripper means on each of said heads for gripping a container, and means for shifting said heads into engagement with the vertically disposed containers on said feeding means for removing the containers therefrom and for further shifting said heads to turn said containers into a horizontal position and to place the containers in said turret pockets for further advancement.

6. A container feeding mechanism, comprising in combination a rotatable carrier member, a runway extending toward the outer periphery of said carrier member for guiding containers in a vertical position, conveyor means adjacent said runway for advancing said vertically disposed containers in processional order therealong toward said carrier member, means for actuating said conveyor in unison with said carrier member, an auxiliary feeding turret disposed adjacent and in axial alignment with said carrier member, said turret having spaced peripheral pockets for receiving containers in a horizontal position, means adjacent said pockets for retaining said containers in place, actuating means for rotating said carrier member and said feeding turret in unison, a plurality of gripper heads mounted on said carrier member in movable relation thereto, said heads being singly located adjacent said turret pockets, gripper means on each of said heads for gripping a container, and means for shifting said heads into engagement with the vertically disposed containers in said runway for removing the containers therefrom and for further shifting said heads to turn said containers into a horizontal position and to place the containers in said turret pockets for further advancement.

7. A container feed mechanism comprising in combination a rotatable carrier member having container receiving means at the periphery thereof, feeding means adjacent the periphery of said carrier member for advancing a container to said container receiving means, gripper means movably mounted on said carrier member for gripping the container thus advanced to the container receiving means and for turning the container to a different position, means for shifting said gripper means on its mounting during rotation of the carrier member, and discharge means adjacent said feeding means and the periphery of said carrier member and spaced from said feeding means axially relative to said carrier member for receiving the turned containers from said gripping means.

8. A container feed mechanism comprising in combination a carrier member rotatable on a substantially horizontal axis and having container receiving means at the periphery thereof, feeding means above the periphery of said carrier member for advancing a container to said container receiving means, gripper means movably mounted on said carrier member for gripping an end of the container thus advanced to the container receiving means and for turning the container in a different position, means for shifting said gripper means on its mounting during rotation of the carrier member, and discharge means above said carrier member and spaced from said feeding means axially relative to said carrier member for receiving the turned containers from said gripping means.

9. A container feed mechanism comprising in combination a rotatable carrier member having container receiving means at the periphery thereof, container feeding means extending toward the periphery of said carrier member and spaced from said container receiving means axially relative to said carrier member for advancing containers toward the carrier member, gripper means movably mounted on said carrier member and having a gripper face rotatable through an arcuate path of travel and initially disposed in substantially tangential relationship to said path of travel for initially gripping an end of a container on said container feeding means and for thereafter turning the container to a different position and depositing it in said container receiving means on the rotatable carrier.

10. A container feed mechanism comprising in combination a rotatable carrier member having container receiving and advancing means at the periphery thereof, auxiliary container advancing means adjacent the periphery of said carrier member and spaced from said rotatable advancing means axially relative to said carrier member, gripper means movably mounted on said carrier member for gripping a container on one of said container advancing means and for turning the container and depositing it in a different position on the other of said advancing means, and means for shifting said gripper means on its mounting during rotation of the carrier member to effect the transfer of the container from one advancing means to the other.

11. A container feed mechanism comprising in combination a rotatable carrier member having container receiving means at the periphery thereof, feeding means adjacent the periphery of said carrier member for advancing a container to said container receiving means, gripper means movably mounted on said carrier member and provided with a gripper face disposed adjacent said container receiving means and in a plane normal to the axis of said rotary carrier member for initially gripping an end of the container thus advanced to the container receiving means, means for thereafter shifting said gripper means on its mounting during rotation of the carrier member to turn the container to a different position, and discharge means adjacent said feeding means and the periphery of said carrier member and spaced from said feeding means axially relative to said carrier member for receiving the turned containers from said gripping means.

References Cited in the file of this patent

UNITED STATES PATENTS

| | | |
|---|---|---|
| 1,015,319 | Jefferies et al | Jan. 23, 1912 |
| 1,442,983 | Smith | Jan 23, 1923 |
| 2,335,239 | Gladfelter et al | Nov. 30, 1943 |
| 2,408,019 | Gobel et al | Sept. 24, 1946 |